Jan. 30, 1962    F. KLEEKAMM ETAL    3,018,608
PROCESS FOR THE PRODUCTION OF LOW-SHRINKAGE
POLYETHYLENE TEREPHTHALATE THREADS
Filed May 5, 1958
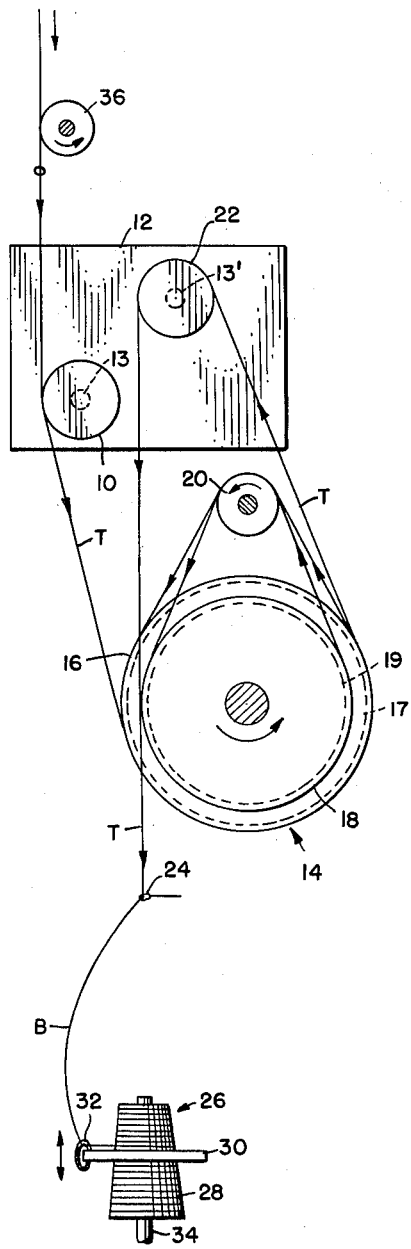
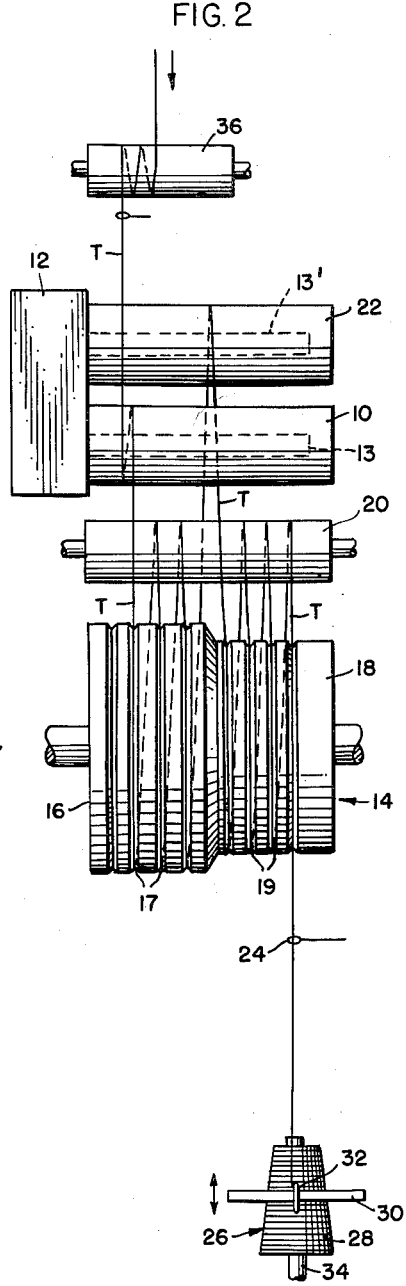
INVENTORS:
FRITZ KLEEKAMM
ERHARD SIGGEL
BY *Margall, Johnston, Cook & Root*
ATT'YS United States Patent Office 3,018,608
Patented Jan. 30, 1962

3,018,608
PROCESS FOR THE PRODUCTION OF LOW-SHRINKAGE POLYETHYLENE TEREPHTHALATE THREADS
Fritz Kleekamm, Obernburg (Main), and Erhard Siggel, Laudenbach (Main), Germany, assignors to Vereinigte Glanzstoff-Fabriken A.G., Wuppertal-Elberfeld, Germany
Filed May 5, 1958, Ser. No. 733,179
Claims priority, application Germany May 8, 1957
6 Claims. (Cl. 57—157)

This invention relates to process for the production of polyethylene terephthalate threads, which are stretched at predetermined temperatures at different tensions to produce low-shrinkage threads, which threads acquire little or no ring rail period in the spooling thereof on twisting spindles.

In the stretching of synthetic threads, a number of processes and devices are known. Some utilize a cold-stretching or drawing of the threads, and others use a heat-stretching or drawing. The stretching can be carried out in one, two, or even more steps. A process has been proposed, for example, for the heat-stretching of threads, especially of polyethylene terephthalate, wherein the thread is stretched at a temperature about 30° C. below the melting point, and then is fixed by heat while the thread is maintained under tension at a temperature which is at least as high as the stretching temperature. In this process, the apparatus constitutes a feed roller, a clamping roller loosely mounted on the feed roller, a pair of stretching rollers, of which one roller can be electrically heated, a second pair of stretching rollers, which are used for the heat-fixing of the thread and, finally, take-off rollers. According to another proposal, the heat-stretching of threads of synthetic high-polymers are described, which are to be used as cord. The mechanism necessary for the stretching consists of two rollers of special construction. The rollers have parallel axes, and the first roller can be heated. The rollers have on the surface grooves in the form of circles on the roller, the diameters of which constantly diminish. The yarn on these rollers is first conducted over the grooves of smaller diameter and finally over the grooves of greater diameter, so that, through the differing tension produced, a stretching takes place. Further, it is a known practice to stretch polyester threads in two stages at different temperatures. In the first stage a stretching temperature is maintained, which lies between the so-called second-degree conversion temperature and the crystallization temperature, with reference in each case to the polyester. In the second stage, the stretching temperature is above the crystallization temperature, at most 50° C. higher. Further, a two-stage stretching of synthetic threads has also been proposed. According to this process the threads are, in principle, stretched by a system of rollers, of which the first roller is heated, while the second roller remains in a cold state. According to another proposal, polyethylene terephthalate threads, in particular, are stretched in two stages. In this process, the thread to be stretched is conducted around a heated, nonrotating tension bar, in which process it softens in contact with this bar under the influence of heat, whereupon it is conducted to a fixed heating surface and here it is maintained under a stretching tension to complete the stretch.

The processes and devices that are known, which processes relate to the stretching of threads of synthetic, linear high polymers, illustrate the fact that heretofore an effort was made, in various ways, to arrive at the same goal in the subsequent processing of the threads, namely the improvement of the textile properties of the threads. The various kinds of known processes, however, have limitations with respect to the properties of the finished threads, yarns, etc. For example, these processes are relatively successful in the improvement of strength and elasticity of the threads, but are basically unsuccessful in also providing other desirable textile properties as well, viz., a low-shrinkage of the threads.

In accordance with our invention, it was found that low-shrinkage polyethylene terephthalate threads are obtained, which can be processed at high velocity on a ring-twist machine without significant so-called ring rail period, provided the stretching is carried out in a quite particular manner. In the winding of polyethylene terephthalate threads onto stretch-twist cops by means of a ring rail, periodic stretching and shrinkage variations occur in the thread by reason of the various balloon tensions caused by the winding function. These variations are significant defects and in the dyeing cause a so-called ring rail period to appear. These periodic variations can be recognized easily in the thread by the Frenzelhahn-diagram.

For the avoidance of the ring rail period, according to the invention, the thread to be stretched is conducted to a fixed braking bar or rod, heated to 80 to 135° C., on which rod the thread is stretched by drawing it off at high velocity. The linear velocity of the thread coming off the braking bar may be varied widely, for example, as low as about 100 meters/min. and may be as high as 400 meters/min. It is advantageous to operate at as fast a linear speed as possible while maintaining adequate and even heating, stretching, and shrinkage of the threads, and, for this purpose, a linear speed in the range of about 150–300 meters/min. is to be preferred. The stretch imparted to the threads at or after the braking bar should be in the range of about 200–500%, based on the original length of the unstretched thread.

Then the stretched thread is conducted over a fixing rod heated to 180 to 210° C., and, at a linear speed of 5 to 10% less than the said high velocity, linear drawing-off speed, the stretched thread is conducted to a second drawing-off member to reduce the shrinkage tendency of the thread, whereupon the thread is wound on a cop of a ring-twist device. By the employment of various fixed temperature ranges for the braking rod and the fixing rod, and by the alteration of the drawing-off speeds, the results described above with reference to the textile properties of the threads obtained could be achieved. The performance of the process is not bound to a particular device. It is, however, advantageous to use the apparatus described in the following for simplicity and accuracy of operation.

Referring to the drawing:
FIG. 1 is a semidiagrammatic, front view illustration of a preferred embodiment of an apparatus for performing the process of the invention; and
FIG. 2 is a semidiagrammatic side view of the apparatus of FIG. 1.

*Example*

The unstretched polyethylene terephthalate thread T coming from a supply source such as a bobbin (not shown) is conducted over the heated surface of the braking bar 10, which has a temperature of 125° C. The braking rod 10 is mounted in a metal support 12 and may be heated by any suitable means such as an electrical resistance-heating rod 13 inside the rod 10. After a single looping of the thread around the metal braking rod 10, the thread arrives at the rotatably driven drawing-off roller 14, which is composed of a larger cylindrical segment 16 and a smaller cylindrical segment 18. The thread loops several times about the segment 16 in guide grooves 17 and about freely rotatable deflection roller 20, which may be canted slightly with respect to the roller 14 for assisting advancing of the thread loops in a direction from left to right as viewed in FIG. 2. After several loopings over the segment 16, the thread T passes over the fixedly-mounted metal fixing rod or bar 22, similar in construction to bar 10, mounted in support 12 and containing an electrical resistance-heating element 13'. The bar 22 is heated to a temperature of 190° C.

After passing over heated bar 22, the thread T runs to segment 18 of the roller 14. The thread, in grooves 19 of segment 18, loops several times over segment 18 without significant slippage in grooves 19 and roller 20. In this arrangement, the grooves 17 have a greater circumference than grooves 19 and hence have a greater linear speed. The thread coming from the braking bar 10, which first passes several times around segment 16, is drawn off without significant slippage at a rate of 200 m./min., and in the process it is stretched four times its original length (400%). On the other hand, the thread conducted to the segment 18 of the drawing-off roller 14 is reduced in drawing-off speed by 8% with reference to the linear drawing-off speed of segment 16. This particular reduction in linear speed is achieved by making the circumference of grooves 19 approximately 8% less than the circumference of grooves 17. The reduced linear speed results in a partial relaxation of the thread tension, which reduction of tension in combination with the heat-fixing on bar 22 materially reduces the shrinkage tendencies of the thread over thread spooled directly from the stretching operation on segment 16.

After leaving segment 18 and roller 20, the thread T passes through guide loop 24 to ring-twist spindle 26 of conventional construction. The basic components of the ring-twist spindle are a cop, illustrated with thread body 28 wound thereon, a vertically reciprocable ring rail 30 with a ring 32 slidably mounted thereon, and a rotatable spindle on which the bobbin is mounted and which is rotatably driven by drive shaft 34. As the spindle and bobbin rotate to wind the thread on the bobbin, the ring 32 travels orbitally about the top on ring rail 30. This orbital motion imparts a twist to the running thread and causes the running thread to assume a constantly rotating balloon-like curvature B. It is in this balloon-like configuration that the aforesaid ring rail period can occur.

For many purposes, the braking bar 10 provides adequate drag on the running thread to permit a relatively even stretching of the thread. However, if desired, a more delicate, even regulation of the amount of stretch can be provided by the use of a rotatably driven roller 36 about which the thread from the supply source is looped several times so as to be in relatively nonslipping relationship. In this arrangement the initial stretch is determined by the difference in the constant peripheral velocities of the roller 36 and the bases of the grooves 17.

By reason of the high peripheral velocity of the drawing-off roller segment 16, the thread is completely stretched on the braking bar 10. The thread, between stages 14 and 16, can shrink, and it is stabilized by the heat transfer at the fixing bar 22. If the thread were conducted from the drawing-off segment 16 immediately after the complete stretching of about 1:4 to the ring-twisting device, then threads would be obtained with a shrinkage upon contact with boiling water of about 10 to 12%. By the fixing of the thread at rod 22, however, together with partial relaxation of the thread due to the difference of peripheral velocities of the segments 16, 18, the thread has a boiling shrinkage of only about 2 to 3%. Through the reduction of the boiling shrinkage to from 2 to 3%, the shrinkage tendency is minimized to such an extent that forces in the thread bringing about the shrinkage no longer manifest themselves when the thread is spooled on the ring-twist cop under the variable ring rail tensions.

The invention is hereby claimed as follows:

1. In the processing of polyethylene terephthalate threads, stretching polyethylene terephthalate thread running at high linear velocity over a surface heated to about 80–135° C., passing the stretched thread over a second surface heated to about 180–210° C. at a linear velocity about 5–10% less than the aforesaid linear velocity to partially relax the tension in said thread, and thereafter twist-winding the thread on a ring-twist winding device.

2. In the processing of polyethylene terephthalate threads, drawing off polyethylene terephthalate thread from a supply source at a high linear velocity over a stationary surface heated to about 80–135° C., causing the thread running over said heated surface to be stretched, passing the stretched thread over a second stationary surface heated to about 180–210° C. at a linear velocity about 5–10% less than the aforesaid linear velocity to partially relax the tension in said thread, and thereafter twist-winding the thread on a ring-twist winding device.

3. In the processing of polyethylene terephthalate threads for subsequent twisting on a ring-twist device, stretching polyethylene terephthalate thread running at high linear velocity over a stationary surface heated to about 80–135° C., and passing the stretched thread over a second stationary surface heated to about 180–210° C. at a linear velocity about 5–10% less than the aforesaid linear velocity to partially relax the tension in said thread.

4. In the processing of polyethylene terephthalate threads, drawing off polyethylene terephthalate threads from a supply source over a rotating cylindrical surface in relatively nonslipping relationship therewith with the thread in contact with a surface heated to about 80–135° C. and interposed in the path of thread travel between said supply source and said rotating cylindrical surface, stretching the thread running over said heated surface, running the stretched thread in contact with a second surface heated to about 180–210° C., drawing off the thread from said second heated surface over a cylindrical surface rotating at a peripheral velocity of about 5–10% less than said first-mentioned cylindrical surface whereby the tension in said thread is partially relaxed, and thereafter twist-winding said thread on a ring-twist winding device.

5. In the processing of polyethylene terephthalate threads, drawing off polyethylene terephthalate threads from a supply source over the rotating cylindrical surface of a draw roll in relatively nonslipping relationship therewith with the thread in contact with a surface spaced from said draw roll, said surface being heated to about 80–135° C. and interposed in the path of thread travel between said supply source and said draw roll, drawing by said draw roll from said supply source the thread at a linear velocity sufficient to stretch the thread running over said heated surface, running the stretched thread in contact with a second surface spaced from said draw roll, said second surface being heated to about 180–210° C., and drawing off the thread from said second heated surface over a cylindrical surface on the same draw roll, which surface is rotating at a peripheral velocity of about 5–10% less than the peripheral velocity of said first-mentioned cylindrical surface, whereby the tension in said thread is partially released while said thread is in contact with said second surface.

6. In the processing of polyethylene terephthalate threads, drawing off unstretched polyethylene terephthalate thread from a supply source at a high linear velocity in the range of about 100 meters to 400 meters per minute over a stationary surface heated to about 80–135° C., causing the thread running over said heated surface to be stretched by an amount in the range of about 200–500%, based on the original length of the unstretched thread, and passing the stretched thread over a second stationary surface heated to about 180–210° C. at a linear velocity of about 5–10% less than the aforesaid linear velocity to partially release the tension in said thread while it is in contact with said second heated surface.

(References on following page)

References Cited in the file of this patent

UNITED STATES PATENTS

| | | | |
|---|---|---|---|
| 2,208,497 | Coleshill et al. | July 16, | 1940 |
| 2,455,173 | Hitt | Nov. 30, | 1948 |
| 2,509,741 | Miles | May 30, | 1950 |
| 2,584,779 | Averns et al. | Feb. 5, | 1952 |
| 2,611,923 | Hume | Sept. 30, | 1952 |
| 2,803,105 | Stoddard et al. | Aug. 20, | 1957 |
| 2,803,109 | Stoddard et al. | Aug. 20, | 1957 |
| 2,823,514 | Vandamme et al. | Feb. 18, | 1958 |

FOREIGN PATENTS

| | | | |
|---|---|---|---|
| 628,569 | Germany | Apr. 7, | 1936 |

UNITED STATES PATENT OFFICE
CERTIFICATE OF CORRECTION

Patent No. 3,018,608                            January 30, 1962

Fritz Kleekamm et al.

It is hereby certified that error appears in the above numbered patent requiring correction and that the said Letters Patent should read as corrected below.

Column 3, line 40, for "top" read -- cop --.

Signed and sealed this 10th day of July 1962.

(SEAL)
Attest:

ERNEST W. SWIDER                                  DAVID L. LADD
Attesting Officer                                       Commissioner of Patents